(12) United States Patent
van Dijk et al.

(10) Patent No.: US 9,083,515 B1
(45) Date of Patent: Jul. 14, 2015

(54) FORWARD SECURE PSEUDORANDOM NUMBER GENERATION RESILIENT TO FORWARD CLOCK ATTACKS

(71) Applicant: EMC Corporation, Hopkinton, MA (US)

(72) Inventors: Marten van Dijk, Somerville, MA (US); Nikolaos Triandopoulos, Arlington, MA (US); Ari Juels, Brookline, MA (US); Ronald Rivest, Arlington, MA (US)

(73) Assignee: EMC Corporation, Hopkinton, MA (US)

(*) Notice: Subject to any disclaimer, the term of this patent is extended or adjusted under 35 U.S.C. 154(b) by 235 days.

(21) Appl. No.: 13/728,271

(22) Filed: Dec. 27, 2012

(51) Int. Cl.
| | |
|---|---|
| *H04L 9/22* | (2006.01) |
| *H04L 9/08* | (2006.01) |
| *H04L 29/06* | (2006.01) |
| *H04L 9/00* | (2006.01) |

(52) U.S. Cl.
CPC .............. *H04L 9/0869* (2013.01); *H04L 9/005* (2013.01); *H04L 63/068* (2013.01); *H04L 9/0891* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 7,095,850 | B1* | 8/2006 | McGrew ........................ 380/42 |
| 7,810,147 | B2* | 10/2010 | Duane et al. ..................... 726/9 |
| 8,699,713 | B1* | 4/2014 | Rivest et al. .................. 380/277 |
| 8,745,710 | B1* | 6/2014 | Roth et al. ....................... 726/6 |
| 2002/0199102 | A1* | 12/2002 | Carman et al. ................ 713/168 |
| 2006/0184797 | A1* | 8/2006 | Weis et al. .................... 713/178 |

OTHER PUBLICATIONS

Bowers et al., Drifting Keys: Impersonation Detection for Constrained Devices, Proceedings of the IEEE Infocom 2013, Turin, Italy, Apr. 14-19, 2013.

* cited by examiner

*Primary Examiner* — Jung Kim
*Assistant Examiner* — Tri Tran
(74) *Attorney, Agent, or Firm* — Ryan, Mason & Lewis, LLP

(57) ABSTRACT

Methods and apparatus are provided for generation of forward secure pseudorandom numbers that are resilient to such forward clock attacks. A forward secure pseudorandom number is generated by obtaining a first state $s_i$ corresponding to a current leaf node $v_i$ in a hierarchical tree, wherein the current leaf $v_i$ produces a first pseudorandom number $r_{i-1}$; updating the first state $s_i$ to a second state $s_{i+t}$ corresponding to a second leaf node $v_{i+t}$; and computing a second pseudorandom number $r_{i+t-1}$ corresponding to the second leaf node $v_{i+t}$, wherein the second pseudorandom number $r_{i+t-1}$ is based on a forward clock reset index that identifies an instance of the hierarchical tree, wherein the instance of the hierarchical tree is incremented when one or more criteria indicating a forward clock attack are detected. The forward clock reset index can be encoded in a forward secure manner in the hierarchical tree.

31 Claims, 6 Drawing Sheets

FIG. 9

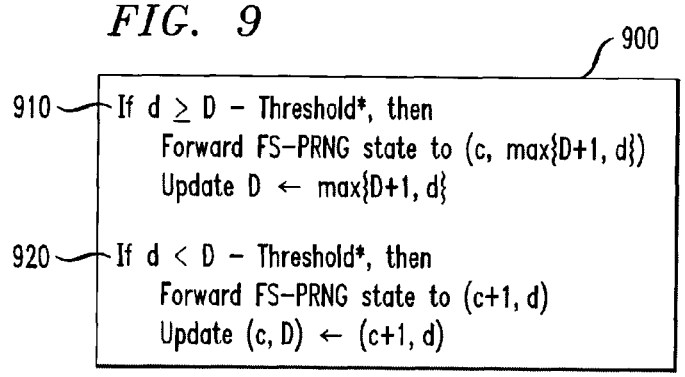

910 — If d ≥ D − Threshold*, then
Forward FS-PRNG state to (c, max{D+1, d})
Update D ← max{D+1, d}

920 — If d < D − Threshold*, then
Forward FS-PRNG state to (c+1, d)
Update (c, D) ← (c+1, d)

FIG. 10

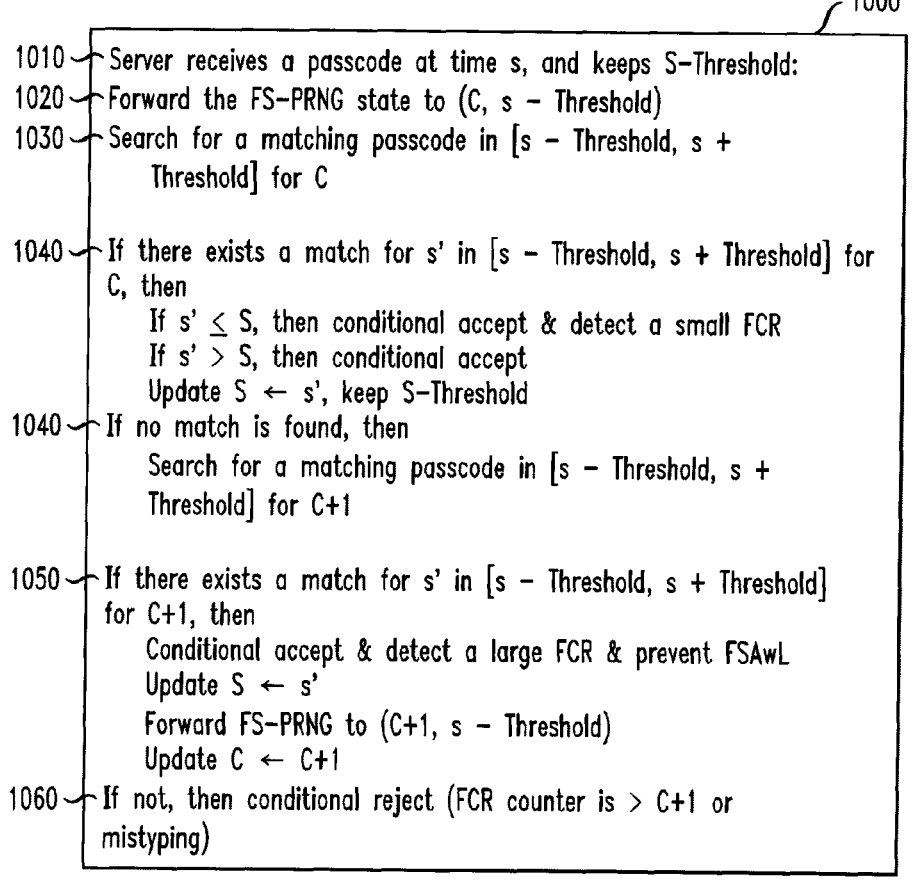

1010 — Server receives a passcode at time s, and keeps S-Threshold:
1020 — Forward the FS-PRNG state to (C, s − Threshold)
1030 — Search for a matching passcode in [s − Threshold, s + Threshold] for C 1040 — If there exists a match for s' in [s − Threshold, s + Threshold] for C, then
  If s' ≤ S, then conditional accept & detect a small FCR
  If s' > S, then conditional accept
  Update S ← s', keep S-Threshold 1040 — If no match is found, then
  Search for a matching passcode in [s − Threshold, s + Threshold] for C+1

1050 — If there exists a match for s' in [s − Threshold, s + Threshold] for C+1, then
  Conditional accept & detect a large FCR & prevent FSAwL
  Update S ← s'
  Forward FS-PRNG to (C+1, s − Threshold)
  Update C ← C+1

1060 — If not, then conditional reject (FCR counter is > C+1 or mistyping)

FIG. 11

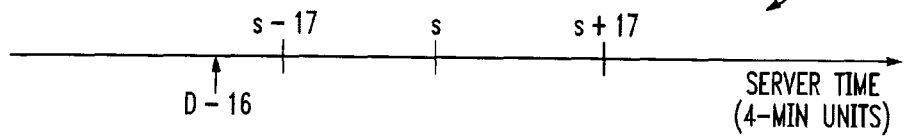

s − 17    s    s + 17
D − 16                    SERVER TIME
                          (4-MIN UNITS)

FORWARD SECURE PSEUDORANDOM NUMBER GENERATION RESILIENT TO FORWARD CLOCK ATTACKS

FIELD OF THE INVENTION

The present invention relates generally to techniques for generating pseudorandom numbers.

BACKGROUND

Forward security refers to a cryptographic property according to which an exposed secret key can affect the security of the underlying system only in the future but not in the past. Forward security is often implemented through systematic pseudorandom key updates, so that the usage of older keys in the past remains secure indefinitely in the future, despite any possible compromises of newer keys that may occur in the future. However, this key-update procedure introduces additional computational and storage overheads, especially for applications where keys must be updated asynchronously or on demand, i.e., a new key that is "distant" from the current key must be produced, thus the key-update procedure must operate in a "jump-ahead" fashion (for example, from a prior month to a current minute).

U.S. patent application Ser. No. 13/334,709, entitled "Methods and Apparatus for Generating Forward Secure Pseudorandom Numbers," (now U.S. Pat. No. 9,008,303), incorporated by reference herein, discloses techniques for forward-secure generation of pseudorandom keys. The disclosed forward-secure pseudorandom generator (FS-PRNG) scheme allows for synchronous and asynchronous key updates, as well as event-driven and time-driven key updates. The disclosed key update procedure provides low catch-up costs while keeping the required storage requirements small.

When keys are generated using software, such as on a smartphone, the key update procedure is often based on the current time of the device used to compute the key (referred to as the device time). For example, to generate a new key (e.g., a passcode), the user typically launches a key update application (app) on the device and enters a personal identification number (PIN) to establish his or her identity. The key update application then determines the current device time, performs a "jump-ahead" operation using a key-update tree structure to catch-up to the current device time, and computes the new key for the current device time.

If the user is able to manipulate the device time, however, the key update application will compute the wrong key for the current actual time. When the device time is later in time than the current actual time (referred to herein as a forward clock attack), the user or attacker is able to obtain a key that will be valid for a later time. In addition, the internal state of the key-update tree is locked to the future device time. Accordingly, if the user later corrects the device time to the actual time, then the forward-secure key generation module becomes blocked/locked to a future time, and thus the system using the forward-secure keys may remain unusable for a certain amount of time (e.g., until the time corresponding to the forward clock attack point is reached). In general, the key generation module of the device will not be in synchronization with the corresponding server (that makes use of the produced keys) as the server (which is expected to accurately keep track of the actual time) will be in a state that corresponds to a future/forwarded point in time, and not with device time.

A need exists for pseudorandom generators (FS-PRNGs) that are forward secure as well as resilient to such forward clock attacks. Resilience, here, means that in the case of forward clock attacks, the system is able to (1) unblock the forward-secure key generation module, (2) detect a forward clock attack, (3) synchronize the module with the correct time used by the corresponding server that makes use of the keys (thus preventing Denial-of-Service attacks related to lack of synchronization), and (4) possibly even prevent the usage of the leaked-in-the-future key by an attacker.

SUMMARY OF THE INVENTION

The present invention in the illustrative embodiments described herein provides methods and apparatus for generation of forward secure pseudorandom numbers that are resilient to such forward clock attacks. According to one aspect of the invention, a forward secure pseudorandom number is generated by obtaining a first state $s_i$ corresponding to a current leaf node $v_i$ in a hierarchical tree, wherein the current leaf $v_i$ produces a first pseudorandom number $r_{i-1}$; updating the first state $s_i$ to a second state $s_{i+t}$ corresponding to a second leaf node $v_{i+t}$; and computing a second pseudorandom number $r_{i+t-1}$ corresponding to the second leaf node $v_{i+t}$, wherein the second pseudorandom number $r_{i+t-1}$ is based on a forward clock reset index that identifies an instance of the hierarchical tree, wherein the instance of the hierarchical tree is incremented when one or more criteria indicating a forward clock attack are detected. The forward clock reset index can be encoded in a forward secure manner in the hierarchical tree, such as encoded as a layer in the hierarchical tree. The criteria indicating a forward clock attack can comprise, for example, a current device time being less than a difference between a last used device time during a generation of the pseudorandom number and a predefined threshold.

The disclosed exemplary techniques for generating forward secure pseudorandom numbers overcome one or more of the problems associated with the conventional techniques described previously. These and other features and advantages of the present invention will become more readily apparent from the accompanying drawings and the following detailed description.

BRIEF DESCRIPTION OF THE DRAWINGS

FIG. 9 illustrates pseudo code for an exemplary operation of the security passcode application of FIG. 1;

FIG. 10 illustrates pseudo code for an exemplary operation of the server of FIG. 1; and FIG. 11 illustrates the time synchronization between the user device and the server.

DETAILED DESCRIPTION

The present invention provides improved techniques for generating forward secure pseudorandom numbers that are resilient to forward clock attacks. According to one aspect of the invention, a forward clock reset (FCR) index is employed to indicate a synchronization problem between the user device and the server and thereby detect and prevent a forward clock attack. In one exemplary embodiment, the forward clock reset index is encoded using a state that evolves in a forward secure manner. According to another aspect of the invention, by using the FCR index, the user device can be synchronized with the server as long as the Forward Clock Reset index does not exceed a predefined threshold. In one embodiment, the FCR index can be encoded as an additional layer in the key-update tree.

Generally, the disclosed key update procedure is based on the current time of the device used to compute the key (referred to as the device time) and the FCR index. The FCR index also evolves in a forward-secure way, e.g., by employing a cryptographic one-way hash function. The FCR index is encoded in the passcode generation state in a way that uniquely defines an integer value for the index such that, as the index evolves in a forward-secure way, these values are incremented to new values. Passcode generation is based on computing over the FCR index. In essence, the FCR index specifies one of many possible concrete key-update trees.

Figure 1:
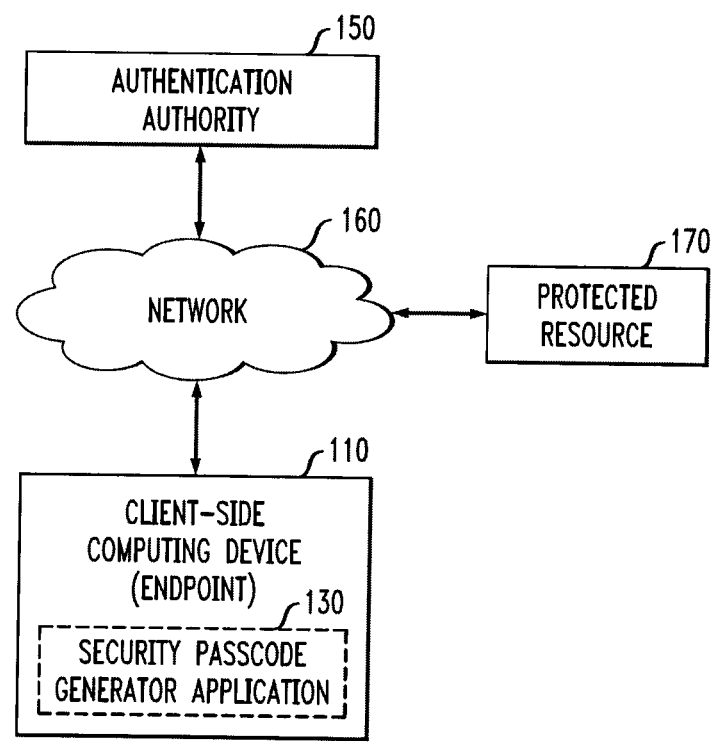
FIG. 1 illustrates an exemplary network environment in which the present invention can operate.

FIG. 1 illustrates an exemplary network environment in which a Secure Client-Server Communications application of the present invention can operate. As shown in FIG. 1, an exemplary client-side computing device (CSCD) 110 communicates with a protected resource 170 over a network 160. In an exemplary implementation, the user must authenticate with an authentication authority 150 using a passcode generated by a security passcode-generator application 130 (hereinafter, referred to as security passcode app 130) before obtaining access to the protected resource 170. The network 160, may comprise, for example, a global computer network such as the Internet, a wide area network (WAN), a local area network (LAN), a satellite network, a telephone or cable network, or various portions or combinations of these and other types of networks.

The user of the CSCD 110 is authenticated with the protected resource 170 using a one-time variable key that may be generated in accordance with the present invention. It is to be appreciated that a given embodiment of the disclosed system may include multiple instances of CSCD 110, security passcode app 130, authentication authority server 150 and protected resource 170, and possibly other system components, although only single instances of such components are shown in the simplified system diagram of FIG. 1 for clarity of illustration.

The security passcode app 130 is shown in FIG. 1 as being implemented by the CSCD 110. The security passcode app 130 may be implemented, for example, using the RSA SecurID® user authentication token commercially available from RSA Security Inc. of Bedford, Mass., U.S.A. The security passcode app 130 may be a server or other type of module that is accessible over the network 160, or it may be a software component resident on the CSCD 110. As another alternative, security passcode app 130 may be distributed over multiple devices, one of which may be the CSCD 110. Thus, while the present invention is illustrated herein using a security passcode app 130 executing on the CSCD 110, such that the CSCD 110 can read a given passcode (or another authentication value) directly from the security passcode app 130, other implementations are within the scope of the present invention, as would be apparent to a person of ordinary skill in the art. For example, for other security passcode apps 130 that are not connectable to a computer or other user device in this manner, the user may manually enter a password or another value displayed by the security passcode app 130 at the time of the attempted access. In addition, for a detailed discussion of a modular and/or component implementation of a token-based authentication technique, see, for example, U.S. Pat. No. 7,562,221 to Nystrom et al., assigned to the assignee of the present invention and incorporated by reference herein.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention. The CSCD 110 may also be referred to herein as simply a "user." The term "user" should be understood to encompass, by way of example and without limitation, a user device, a person utilizing or otherwise associated with the device, or a combination of both. A password or other authentication information described as being associated with a user may, for example, be associated with a CSCD device 110, a person utilizing or otherwise associated with the device, or a combination of both the person and the device.

The authentication authority 150 is typically a third party entity that processes authentication requests on behalf of web servers and other resources, and verifies the authentication information that is presented by a CSCD 110.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

Forward Security Through Key Updates

With forward security, the secret state is not partitioned into any pieces, but it evolves over time: the current secret state is deleted and replaced by a new secret state, and this process continues periodically or on demand for the entire lifetime of the system. The offered security property is immediate: if a secret state is (securely) erased by the system, then it cannot be stolen or leaked. Therefore, such frequent updates in the secret state amplify the security of the system because old secret states cannot be stolen or leaked, and thus remain cryptographically or even information-theoretically secure indefinitely in the future.

However, for efficiency purposes, the new produced secret state typically depends on the current state. For instance, if a public-key cryptographic construction is used by the system, then it is desired that the current secret key can be replaced by a new secret key so that both secret keys correspond to the same public key (i.e., the public key should not be updated), and in this case the new secret key depends on (e.g., is derived by) the current secret key. In this case, forward security enforces an important additional property according to which any dependencies among the secret states are cryptographically protected in the backward direction: the new secret state is derived by the current state in a one-way fashion, so that the former does not compromise the latter and, therefore, a given state does not compromise any of the older states. In other words, once replaced (and erased by the system) a secret state remains secure in the forward direction, i.e., any replaced secret state is cryptographically protected, and infeasible to compromise, indefinitely in the future.

Overall, forward security is an important property since it becomes extremely useful in many applications where the security of the system must not be fully compromised should the current secret key be leaked. For instance, under the pessimistic but realistic assumption that a system is more likely to be attacked and compromised in the course of its operational lifetime, forward security can be considered the best-response solution: one can make sure that when this system compromise occurs, then the security of the underlying system is affected only in the future but not in the past. That is, one has to stop using the system but all past usages of the system still remain secure: for instance, if the secret key of a forward-secure signature scheme is exposed, then the corresponding public key must be revoked as being insecure, but all signed messages under past secret keys remain secure.

As previously indicated, forward security is implemented through systematic key updates in the system, where a new key replaces the current one, so that the usage of older keys in the past remains secure indefinitely in the future despite any possible compromises of newer keys that may occur in the future.

For a more detailed discussion of forward security via pseudorandom number generators, see, for example, U.S. patent application Ser. No. 13/334,709, entitled "Methods and Apparatus for Generating Forward Secure Pseudorandom Numbers," (now U.S. Pat. No. 9,008,303), incorporated by reference above.

Figure 2:
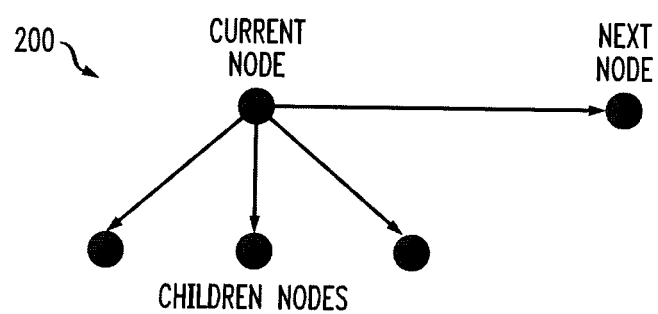
FIG. 2 illustrates a portion of an exemplary FS-PRNG tree that can be employed by the present invention.

FIG. 2 illustrates a portion of an exemplary FS-PRNG tree 200 that can be employed by the present invention. As shown in FIG. 2, the exemplary FS-PRNG tree portion 200 comprises a plurality of nodes. Nodes can expand from a current node in two ways. Nodes can be part of a chain, where the next node in the chain can be generated from a node (up to some maximum chain length), as discussed further below in conjunction with FIG. 3. In addition, nodes can have children, which can each be computed from the current node, as discussed further below in conjunction with FIG. 4.

Figure 3:
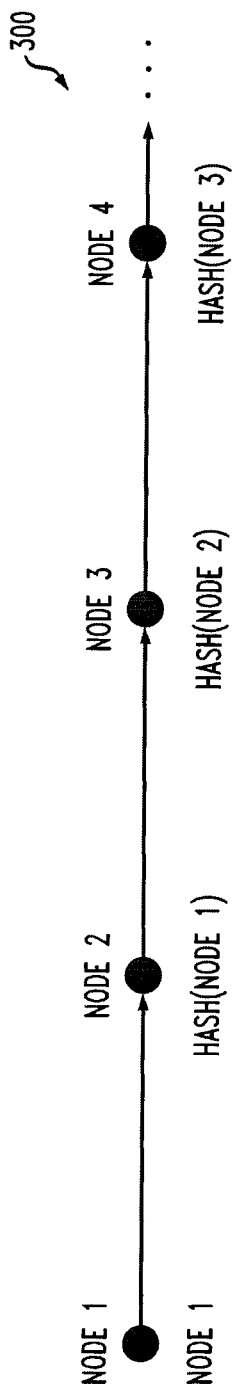
FIG. 3 illustrates a computation of a next node in a chain of an exemplary FS-PRNG tree.

FIG. 3 illustrates a computation of a next node in a chain 300 of an exemplary FS-PRNG tree. Generally, the next node in a chain 300 is obtained by applying a hash function to the prior node, as follows:

Node2=Hash(Node1);
Node3=Hash(Node2)=Hash(Hash(Node1)): and
Node4=Hash(Node3)=Hash(Hash(Node2))=Hash(Hash(Hash(Node1))).

Figure 4:
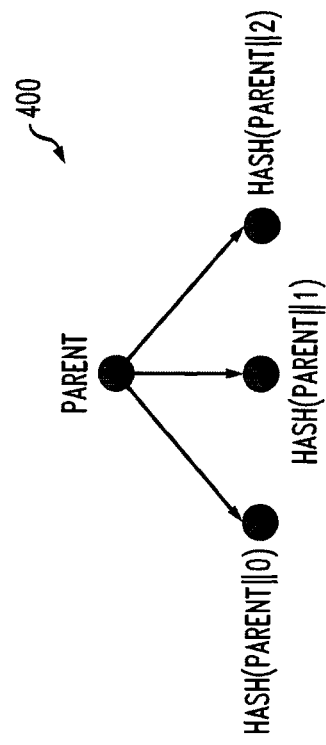
FIG. 4 illustrates a computation of one or more child nodes of a parent node of an exemplary FS-PRNG tree.

FIG. 4 illustrates a computation of one or more child nodes of a parent node of an exemplary FS-PRNG tree 400. Generally, a child node of a current node is obtained by applying a hash function to the parent node, concatenated with an index of the child (e.g., Child_i=Hash(Parent∥i), as follows:

Child_0=Hash(Parent∥0);
Child_1=Hash(Parent∥1); and
Child_2=Hash(Parent∥2).

A $(d,(k_0, l_1), \ldots, (k_{d-1}, l_d), k_d)$ tree is specified as follows:
(total tree depth (d),
(length of chain at level 0 ($k_0$),
number of children of level 0 parent ($l_1$)),
(length of chain at level 1 ($k_1$),
number of children of level 1 parent ($l_2$)),
(length of chain at level d–1 ($k_{d-1}$),
number of children of level d–1 parent ($l_d$),
length of chain at level d ($k_d$).

Figure 5:
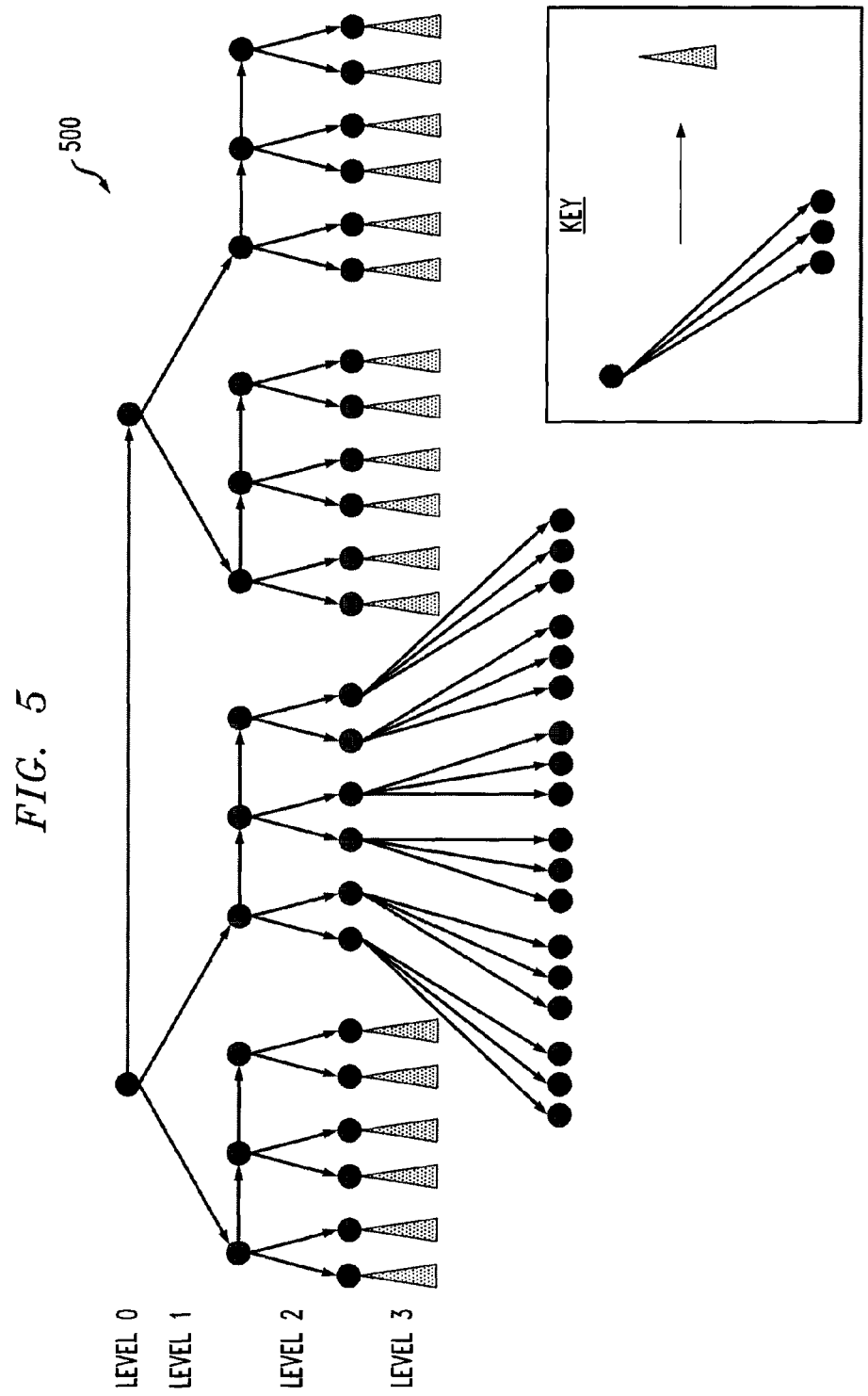
FIG. 5 illustrates an exemplary (3, (2,2), (3,2), (1,3), 1) tree.

FIG. 5 illustrates an exemplary (3, (2,2), (3,2), (1,3), 1) tree 500. The exemplary tree 500 shown in FIG. 5 thus has a depth of 3 and 4 levels. The first level (level 0) has a chain length of 2, and a degree of 2. The second level (level 1) has a chain length of three, and a degree of two. The third level (level 2) has a chain length of one, and a degree of three. Finally, the fourth level (level 3) has a chain length of one (and no children).

Figure 6:
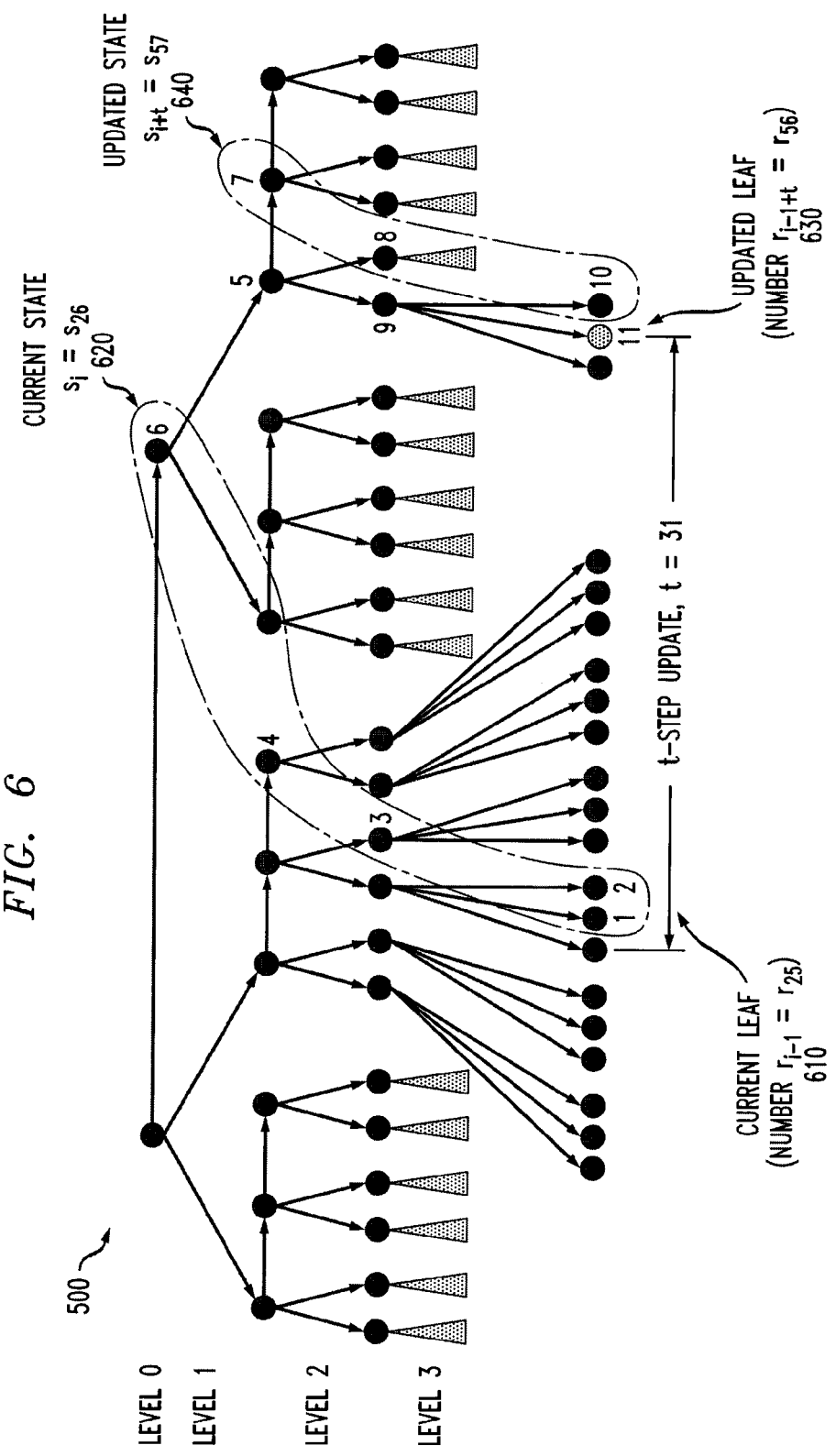
FIG. 6 illustrates the exemplary tree of FIG. 5 in further detail.

FIG. 6 illustrates the exemplary (3, (2,2), (3,2), (1,3), 1) tree 500 of FIG. 5 in further detail. As shown in FIG. 6, the exemplary tree 500 comprises a current leaf node 610 (number $r_{i-1}=r_{25}$); a current state 620 $s_i=s_{26}$ comprised of four nodes; an updated leaf 630 (number $r_{i-1+t}=r_{56}$) and an updated state 640 $s_{i+t}=s_{57}$ comprised of three nodes. The current state 620 and updated state 640 are populated using successor and sibling rules.

As discussed hereinafter, aspects of the present invention generate a forward secure pseudorandom number $r_{i+t-1}$, given the current state 620 and the t-step update. The current state 620 has a current leaf node 610 that produces a first pseudorandom number $r_{i-1}$, by updating the current state 620 to the updated state 640 corresponding to the updated leaf node 630. The forward secure pseudorandom number $r_{i+t-1}$ corresponds to the updated leaf node 630.

As shown in FIG. 6, in order to update the current state 620 to the updated state 640 corresponding to the updated leaf node 630, the following exemplary order of operations is performed:

Upward tree traversal from current state 620:
delete(node 1); delete(node 2); delete(node 3); delete(node 4).

Downward tree traversal from node in current state 620 at level 0 to updated leaf node 630:
compute(node 5); delete(node 6); compute(node 7); compute(node 8); compute(node 9); delete(node 5); compute (node 10); compute(node 11); and delete(node 9).

For a more detailed discussion of how to perform upward tree traversals from a current state and downward tree traversals from a node in the current state at level 0 to an updated leaf node, see, for example, U.S. patent application Ser. No. 13/334,709, entitled "Methods and Apparatus for Generating Forward Secure Pseudorandom Numbers," (now U.S. Pat. No. 9,008,303), incorporated by reference above. For example, U.S. patent application Ser. No. 13/334,709 describes traversal of a hierarchical tree using an exemplary queue implemented as a last-in-first-out buffer. The exemplary queue comprises a state s, having a sequence of one or more seeds in the hierarchical tree and corresponding position information identifying a position of the corresponding seed in the hierarchical tree. The one or more seeds in the exemplary queue are processed by a next algorithm in a predefined order based on the corresponding position information to traverse a portion of the hierarchical tree to the second state $s_{i+t}$.

Forward Clock Attacks

As previously indicated, when keys or passcodes are generated using software, the key update procedure is typically based on the current time of the device used to compute the key (referred to as the device time). If a user is able to manipulate the device time, the key update application will compute the wrong key for the current actual time. When the device time is later than the current actual time (referred to herein as a forward clock attack), the user (such as an attacker) is able to obtain a key that will be valid for a later time.

Figure 7:
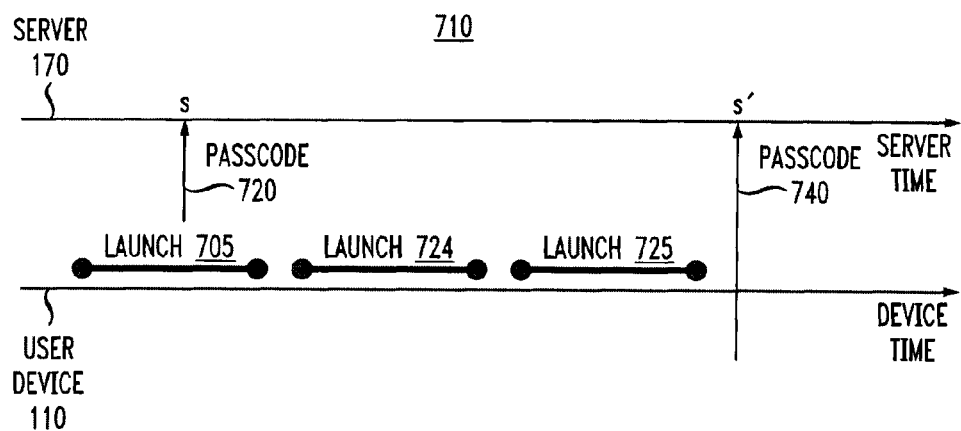
FIG. 7 illustrates an exemplary forward clock attack.

FIG. 7 illustrates an exemplary forward clock attack. As shown in FIG. 7, a user of the CSCD 110 attempts to log in to a protected resource, such as server 170, at a time 710. In order to access the server 170, the user launches the security passcode app 130 at a current device time 705. As discussed hereinafter, if a valid passcode 720 is presented by the user, the user will be granted access to the server 170, if the difference between the current device time at time 710 and the current server time at a time s when the passcode 720 is presented to the server 170 is within a predefined threshold.

Thereafter, the user, such as an attacker, changes the device time to a future time and launches the security passcode app 130 at a current device time 725 to obtain a new current or future passcode 740. The new passcode 740 is not presented, however, to the server 170 until the future server time at time s'. The device time can optionally or likely be reset by the attacker or the legitimate user, respectively, to the correct current time.

As discussed hereinafter, aspects of the present invention employ a forward clock reset index to indicate a synhronization problem between the user device 110 and the server 170 and thereby detect and prevent a forward clock attack, if the user launches the security passcode app 130 at time 724 after an adversarial passcode collection at time 725 but before an attempted login by the attacker at server time s'. (When the server time and device time are again synchronized and if the user happens to launch the security passcode app 130 at a time 724 after the server time s', then the forward clock attack cannot be detected by either the user device or the server based only on timing information.)

The present invention provides improved techniques for generating forward secure pseudorandom numbers that are resilient to such forward clock attacks. According to one aspect of the invention, by using the FCR index, the user device 110 can be synchronized with the server as long as the Forward Clock Reset does not exceed a predefined threshold.

Figure 8:
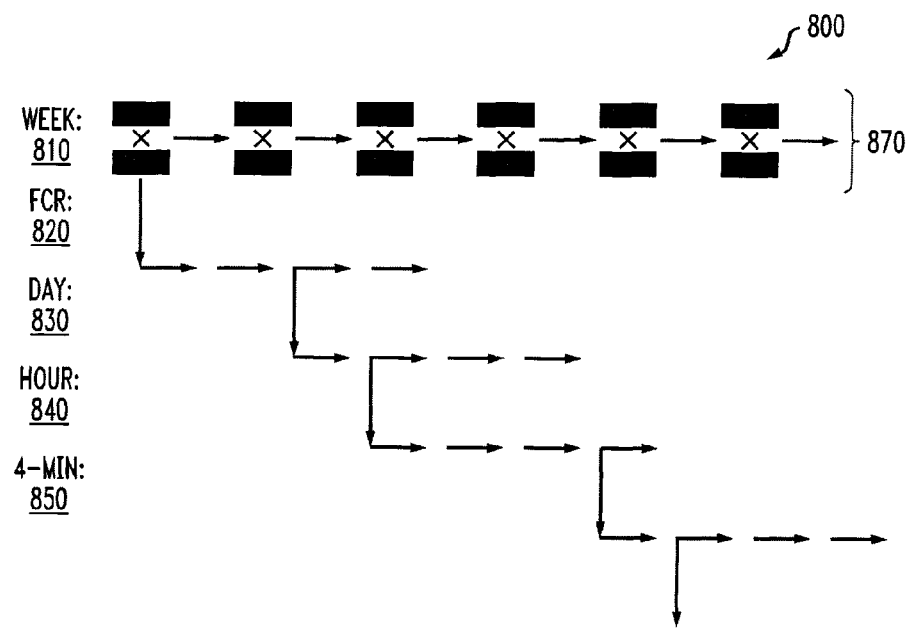
FIG. 8 illustrates an exemplary key-update tree where an FCR index is encoded as an additional layer in the key-update tree.

FIG. 8 illustrates an exemplary key-update tree 800 where an FCR index is stored as an additional layer 820 in the key-update tree 800. As discussed hereinafter, a synchronization problem is detected by the security passcode app 130. The FCR index is incremented when the security passcode app 130 detects a synchronization problem between the user device 110 and the server 170. Generally, the FCR index serves as an additional dimension that characterizes and defines the key-update tree by indicating which version of a key-update tree is used by the device where a different key-update version is used when a forward clock attack desynchronization problem is identified by the device or when the device is notified externally about such a desynchronization problem. In one exemplary embodiment, a synchronization problem is defined as the current device time being in general less than the previously recorded time that the security passcode app 130 was launched minus a threshold value Threshold* set as a parameter. This threshold value is used to eliminate false positives in the detection of forward clock attacks for accidental forward device time changes, followed by a launch of the security passcode app 130, followed by a correction of the device time, that are being introduced by a legitimate user. Generally, the FCR index 820 identifies an instance of a key-update tree given a particular week. The current value of the FCR index is c.

Generally, the disclosed key update procedure is based on the current time of the device used to compute the key (referred to as the device time) and the FCR index. In the exemplary key-update tree 800 of FIG. 8, time is expressed as a plurality of levels using a week level 810, a day level 830, an hour level 840, and a 4-min level 850.

For example, if the week level 810 can be specified within a 5 year interval, the week can have (5*52) possible values. The day level 830 can have 7 possible values, the hour level 840 can have 24 possible values and the 4-min level 850 can have 15 possible values.

In one exemplary embodiment, in order to provide additional instrusion-resilient security at the server side, the top tree level (e.g., corresponding to weeks) is comprised of two interleaving chains of keys (e.g., one "Blue" and one "Red") and the produced passcode is validated by a pair 870 of authentication servers. It is noted that there is a distinct tree 800 for each authentication server and that each top-level chain defines a distinct corresponding tree comprised with chains of lower levels, and therefore two corresponding FCR indices (e.g., "Blue" and "Red") that take on values that encode the state (index) c. For a more detailed discussion of a multi-server authentication server, see, for example, U.S. patent application Ser. No. 13/404,737, entitled, "Method and Apparatus for Authenticating a User Using Multi-Server One-Time Passcode Verification," incorporated by reference herein. The use of two interleaving top tree levels and two corresponding servers is optional. Even with this extension, the verification of passcodes can be performed by only one server that employs the combined key-update tree shown in FIG. 8. The operation of the FCR index stays the same even in this multiple-tree extension—the only requirement is that in the multiple-tree extension in the case where the FCR index is represented as a chain in a separate level, this level cannot be the top one.

FIG. 9 illustrates pseudo code for an exemplary operation of the security passcode app 130. As shown in FIG. 9, during step 910, according to a next passcode rule (NPR), the current device time (d) and the last used device time (D) during a launch for passcode generation become synchronized. A test is performed during step 910 (expected case) to determine if d is greater than or equal to the difference between D and a threshold (Threshold*) that allows minor variations between the two clocks. If d is greater than or equal to the difference between D and the threshold Threshold*, then the FS-PRNG state is forwarded to the next left node to the right of the current leaf node (c, max {D+1,d}) (and the FCR index remains the same) and D is updated to max {D+1,d}, where:

c=current value of the FCR counter in the token;
FS-PRNG state of token=(c, D);
s=current server time;
S=last server time corresponding to a correct passcode (S≤D);
C=current value of the FCR counter at the server;
FS-PRNG state of server≤(C, max {S, s−Threshold});
the server maintains time S-Threshold; and
Threshold is a second threshold value (possibly different than Threshold*) that is defined later.

A further test is performed during step 920 to determine if d is less than the difference between D and the threshold Threshold* (e.g., to determine if there has been a forward clock attack). If d is less than the difference between D and the threshold Threshold*, then a forward clock attack is detected and the FS-PRNG state is forwarded to (c+1, d) and thus state (c, D) is updated to (c+1, d) (i.e., the FCR is incremented). It is noted that c+1 is an FCR index associated with a different version of the key-update tree. The FS-PRNG state at the security passcode app 130 is always forwarded. In this manner, the user device 110 detects the forward clock attack (FCA) and notifies the server 170 of the FCA during the next passcode transmission to the server.

FIG. 10 illustrates pseudo code for an exemplary operation of the server 170. At all times the server maintains time S-Threshold, where Threshold is a second threshold value that allows for small legitimate differences between the device time and the server time (e.g., due to imperfect time synchronicity or of users that travel across different time zones). As shown in FIG. 10, during step 1010, the server 170 receives a passcode at time s. The server 170 forwards the FS-PRNG state to (C, s−Threshold) during step 1020 and then searches for a matching passcode during step 1030 in [s−Threshold, s+Threshold] for C.

If it is determined during step 1040 that there exists a match for s' in [s−Threshold, s+Threshold] for C, then:

If s'≤S, then the server conditionally accepts and detects a small FCR;

If s'>S, then the server conditionally accepts;

Update S←s', keep S-Threshold.

Here, "conditionally accept" means that the server may accept the connection depending on the policy and possibly on other information related to Silent Alarms, s' and S (e.g., the user may be requested to provide a second passcode). See, U.S. patent application Ser. No. 13/404,788, filed Feb. 24, 2012, entitled "Methods and Apparatus for Silent Alarm Channels Using One-Time Passcode Authentication Tokens," incorporated by reference herein.

If it is determined during step 1040 that no match is found, then the server searches for a matching passcode in [s−Threshold, s+Threshold] for C+1.

If it is determined during step 1050 that there exists a match for s' in [s−Threshold, s+Threshold] for C+1, then the server:

Conditionally accept and detect a large FCR & prevent FSAwL;

Update S←s';

Forward FS-PRNG to (C+1, s−Threshold); and

Update C←C+1

If it is determined during step 1060 that there is no match, then the server conditionally rejects the access attempt (e.g., FCR counter is >C+1 or there has been a mistyping).

Synchronization

As indicated above, when a forward clock attack causes a synchronization problem between the user device and the server, by using the FCR index, the user device can be synchronized with the server as long as the Forward Clock Reset index does not exceed a predefined threshold.

In a particular example, the current device time d may be in the range [s−Threshold, s+Threshold] for 2*Threshold= (2*15+2)*(4 min). At times, the current device time d is less than the server time (s)−Threshold (e.g., due to a time zone shift, the device clock does not function well). At other times, the current device time d is greater than the server time (s)+Threshold.

FIG. 11 illustrates the time synchronization 1100 between the user device 110 and the server 170. As shown in FIG. 11, an exemplary embodiment employs a threshold Threshold of 68 minutes (17 4-minute passcode intervals) to accommodate a one-hour time zone difference change plus 8 minutes of regular clock drifting. Thus, a valid server time range is [s−17, s+17]. Additionally, the treshold value Threshold* may be considered to be 64 minutes (16 4-minute passcode intervals).

If the current device time d is greater than or equal to (D−16), then a state (c, max{D+1,d}) is used for passcode generation, as follows (it is assumed in FIG. 11 that the current value of the FCR counter in the token equals the current value of the FCR counter in the server):

If max{D+1,d} is in the server time range [s−17, s+17], then, since (s')=max{D+1,d}>S, hence, accept the access attempt (in-sync).

If max{D+1,d} is not in the server time range [s−17, s+17], (it is assumed that the passcode does not accidentally fit this interval for C+1) then conditionally reject the access attempt.

If the user is rejected, the user may decide to sync the device time such that d s and try again, no matter how many times the user tried an unsuccessful verification attempt, as follows:

If the current server time s is greater than or equal to (D−16), then it is treated as before (s<max{D+1,d}<s+17).

If the current server time s is less than (D−16), then the FCR index is increased, as discussed hereinafter.

In the following discussion, there are two forward clock resets from D to d to s.

If the current device time d is less than (D−16), then a state (c+1, d) is used for passcode generation and D'←d are in sync, as follows:

If the current device time d is in the server time range [s−17, s+17] (assume passcode does not fit this interval for C), then accept the access attempt (in-sync with respect to time and FCR counter);

If the current device time d is not in the server time range [s−17, s+17], then C is not increased and the access attempt is conditionally rejected.

If the user is rejected, the user may decide to sync the device time such that d←s and try again, no matter how many times the user tried an unsuccesful verification attempt, as follows:

If the current server time s is greater than or equal to (D'−16), then it is treated as before (s≤max{D+1,d}≤s+17).

If the current server time s is less than (D'−16), then another FCR is performed by increasing the FCR index, increasing c+1 to c+2 and declaring a denial-of-service (DoS).

In the exemplary embodiment, the above FCR counter synchronization may fail under the following circumstances:

a mistyped passcode for correct time matches one for C+1;

a correct or mistyped passcode after a FCR matches one for C; and a token resets FCR index at least twice during separate launches since the last login for more than the threshold Threshold*.

In a further variation of the invention, the server checks the time window for C and C+1, as well as for C+2, ..., C+w. In one exemplary embodiment, w is equal to 2 in order to avoid the legitimate-use-DoS scenario mentioned above (s, d, and D are all in sync, c is increased to c+2, so, the server will find a match for C+2). It is noted that increasing w will increase the probability that c and C get out of sync.

Conclusion

As previously indicated, the above-described embodiments of the invention are presented by way of illustrative example only. Numerous variations and other alternative embodiments may be used, as noted above. The present invention provides new general-purpose techniques for generating forward secure pseudorandom numbers.

Additional details regarding certain conventional cryptographic techniques referred to herein may be found in, e.g., A. J. Menezes et al., Handbook of Applied Cryptography, CRC Press, 1997, which is incorporated by reference herein.

Advantageously, the illustrative embodiments do not require changes to existing communication protocols. It is therefore transparent to both existing applications and communication protocols.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It should again be emphasized that the particular authentication and communication techniques described above are provided by way of illustration, and should not be construed as limiting the present invention to any specific embodiment or group of embodiments. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for generating a forward secure pseudorandom number, comprising:
obtaining a first state $s_i$ corresponding to a current leaf node $v_i$ in a hierarchical tree, wherein said first state $s_i$ comprises a sequence of one or more seeds in said hierarchical tree, wherein said first state $s_i$ is stored in a memory of a hardware device as at least one data structure, wherein said at least one data structure comprises each of said one or more seeds of said first state $s_i$ and corresponding position information identifying a position of said corresponding seed in said hierarchical tree, wherein said current leaf $v_i$ produces a first pseudorandom number $r_{i-1}$;
updating said first state $s_i$ to a second state $s_{i+t}$ corresponding to a second leaf node $v_{i+t}$ by processing said one or more seeds in said at least one data structure in a predefined order based on said corresponding position information to traverse a portion of the hierarchical tree to the second state $s_{i+t}$; and
computing a second pseudorandom number $r_{i+t-1}$ corresponding to said second leaf node $v_{i+t}$ wherein said second pseudorandom number $r_{i+t-1}$ is based on a forward clock reset index that identifies an instance of said hierarchical tree, wherein said instance of said hierarchical tree is incremented when one or more criteria indicating a forward clock attack are detected.

2. The method of claim 1, wherein said forward clock reset index is encoded in a forward secure manner in said hierarchical tree.

3. The method of claim 2, wherein said forward clock reset index is encoded as a layer in said hierarchical tree.

4. The method of claim 1, wherein said first state $s_i$ comprises said forward clock reset index and one or more of a current device time and a last used device time during a generation of said second pseudorandom number.

5. The method of claim 4, further comprising the step of updating a last used device time to said current device time during a generation of said second pseudorandom number.

6. The method of claim 1, wherein said criteria indicating a forward clock attack are detected comprise a current device time being less than a difference between a last used device time during a generation of said second pseudorandom number and a predefined threshold.

7. The method of claim 1, further comprising the step of updating said forward clock reset index if said forward clock attack is detected.

8. The method of claim 1, wherein a server identifies a matching passcode in a hierarchical tree identified by said forward clock reset index stored by said server in a range between a current server time less a threshold and said current server time plus said threshold.

9. The method of claim 8, further comprising the step of updating a server time corresponding to a correct passcode to be equal to a time of said identified match.

10. The method of claim 8, wherein said server conditionally accepts an access attempt and detects a small forward clock reset (FCR) if a time of said access attempt is less than or equal to a last server time corresponding to a correct passcode.

11. The method of claim 8, wherein said server conditionally accepts an access attempt if a time of said access attempt is greater than a last server time corresponding to a correct passcode.

12. The method of claim 1, wherein a server does not identify a matching passcode in a hierarchical tree identified by said forward clock reset index stored by said server in a range between a current server time less a threshold and said current server time plus said threshold.

13. The method of claim 1, further comprising the step of said server searching a hierarchical tree identified by one or more increments to said forward clock reset index.

14. The method of claim 13, wherein said server rejects an access attempt if said server does not identify a matching passcode in one of said hierarchical trees identified by said one or more increments to said forward clock reset index.

15. The method of claim 13, wherein said server conditionally accepts an access attempt and detects a large forward clock reset (FCR) if said server identifies a matching passcode in one of said hierarchical trees identified by said one or more increments to said forward clock reset index.

16. The method of claim 15, further comprising the step of updating a server time corresponding to a correct passcode to be equal to a time of said identified match.

17. The method of claim 15, further comprising the step of incrementing said forward clock reset index by one or more increments.

18. The method of claim 1, wherein one or more of said forward secure pseudorandom numbers are generated using a given one of a plurality of hierarchical trees and are processed by a corresponding one of a plurality of authentication servers.

19. The method of claim 1, wherein said hierarchical tree comprises at least one chain comprised of a plurality of nodes on a given level of said hierarchical tree.

20. A non-transitory machine-readable recordable storage medium encoded with computer program instructions for generating a forward secure pseudorandom number, when executed by one or more processors, cause a computer to perform the following steps:

obtaining a first state $s_i$ corresponding to a current leaf node $v_i$ in a hierarchical tree wherein said first state $s_i$ comprises a sequence of one or more seeds in said hierarchical tree, wherein said first state $s_i$ is stored in a memory of a hardware device as at least one data structure, wherein said at least one data structure comprises each of said one or more seeds of said first state $s_i$ and corresponding position information identifying a position of said corresponding seed in said hierarchical tree, wherein said current leaf $v_i$ produces a first pseudorandom number $r_{i-1}$;

updating said first state $s_i$ to a second state $s_{i+t}$ corresponding to a second leaf node $v_{i+t}$ by processing said one or more seeds in said at least one data structure in a predefined order based on said corresponding position information to traverse a portion of the hierarchical tree to the second state $s_{i+t}$; and computing a second pseudorandom number $r_{i+t-1}$ corresponding to said second leaf node $v_{i+t}$, wherein said second pseudorandom number $r_{i+t-1}$ is based on a forward clock reset index that identifies an instance of said hierarchical tree, wherein said instance of said hierarchical tree is incremented when one or more criteria indicating a forward clock attack are detected.

21. An apparatus for generating a forward secure pseudorandom number, the apparatus comprising:

a memory; and at least one hardware device, coupled to the memory, operative to implement the following steps:

obtain a first state $s_i$ corresponding to a current leaf node $v_i$ in a hierarchical tree, wherein said first state $s_i$ comprises a sequence of one or more seeds in said hierarchical tree, wherein said first state $s_i$ is stored in a memory of a hardware device as at least one data structure, wherein said at least one data structure comprises each of said one or more seeds of said first state $s_i$ and corresponding position information identifying a position of said corresponding seed in said hierarchical tree, wherein said current leaf $v_i$ produces a first pseudorandom number $r_{i-1}$;

update said first state $s_i$ to a second state $s_{i+t}$ corresponding to a second leaf node $v_{i+t}$ by processing said one or more seeds in said at least one data structure in a predefined order based on said corresponding position information to traverse a portion of the hierarchical tree to the second state $s_{i+t}$; and compute a second pseudorandom number $r_{i+t-1}$ corresponding to said second leaf node $v_{i+t}$, wherein said second pseudorandom number $r_{i+t-1}$ is based on a forward clock reset index that identifies an instance of said hierarchical tree, wherein said instance of said hierarchical tree is incremented when one or more criteria indicating a forward clock attack are detected.

22. The apparatus of claim 21, wherein said forward clock reset index is encoded in a forward secure manner in said hierarchical tree.

23. The apparatus of claim 22, wherein said forward clock reset index is encoded as a layer in said hierarchical tree.

24. The apparatus of claim 21, wherein said first state $s_i$ comprises said forward clock reset index and one or more of a current device time and a last used device time during a generation of said second pseudorandom number.

25. The apparatus of claim 24, wherein said at least one hardware device is further configured to synchronize said current device time and a last used device time during a generation of said second pseudorandom number.

26. The apparatus of claim 21, wherein said criteria indicating a forward clock attack are detected comprise a current device time being less than a difference between a last used device time during a generation of said second pseudorandom number and a predefined threshold.

27. The apparatus of claim 21, wherein a server identifies a matching passcode in a hierarchical tree identified by said forward clock reset index stored by said server in a range between a current server time less a threshold and said current server time plus said threshold.

28. The apparatus of claim 21, wherein a server does not identify a matching passcode in a hierarchical tree identified by said forward clock reset index stored by said server in a range between a current server time less a threshold and said current server time plus said threshold.

29. The apparatus of claim 28, further comprising the step of said server searching a hierarchical tree identified by one or more increments to said forward clock reset index.

30. The apparatus of claim 29, wherein said server rejects an access attempt if said server does not identify a matching passcode in one of said hierarchical trees identified by said one or more increments to said forward clock reset index.

31. The apparatus of claim 21, wherein said hierarchical tree comprises at least one chain comprised of a plurality of nodes on a given level of said hierarchical tree.

* * * * *

UNITED STATES PATENT AND TRADEMARK OFFICE
CERTIFICATE OF CORRECTION

| | | |
|---|---|---|
| PATENT NO. | : 9,083,515 B1 | Page 1 of 1 |
| APPLICATION NO. | : 13/728271 | |
| DATED | : July 14, 2015 | |
| INVENTOR(S) | : Marten van Dijk et al. | |

It is certified that error appears in the above-identified patent and that said Letters Patent is hereby corrected as shown below:

In the Specification

Column 5, line 62, replace "$(k_d)$." with --$(k_d)$).--.

Column 8, line 15, add the following after "Verification,"" --(Now U.S. Pat. No. 9,118,661),--.

Column 9, line 25, replace "accept and detect" with --accepts and detects--.

Column 10, line 2, replace "d s" with --d←s--.

Signed and Sealed this
Fifth Day of April, 2016

Michelle K. Lee
*Director of the United States Patent and Trademark Office*